United States Patent
Garrett et al.

(10) Patent No.: US 10,066,949 B2
(45) Date of Patent: Sep. 4, 2018

(54) TECHNOLOGY FOR GIVING USERS COGNITIVE MAPPING CAPABILITY

(71) Applicant: International Business Machines Corporation, Armonk, NY (US)

(72) Inventors: Tricia Y. Garrett, Raleigh, NC (US); Mary J. Mueller, Austin, TX (US); Richard S. Schwerdtfeger, Round Rock, TX (US); Richard Whelan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 15/194,589

(22) Filed: Jun. 28, 2016

(65) Prior Publication Data
US 2017/0370733 A1  Dec. 28, 2017

(51) Int. Cl.
*G01C 21/34* (2006.01)
*G01S 19/42* (2010.01)

(52) U.S. Cl.
CPC .............. *G01C 21/34* (2013.01); *G01S 19/42* (2013.01)

(58) Field of Classification Search
CPC ................................. G01C 21/34; G01C 19/42
USPC .......................................................... 701/425
See application file for complete search history.

(56) References Cited

U.S. PATENT DOCUMENTS

| 8,589,069 | B1* | 11/2013 | Lehman | G01C 21/20 340/995.1 |
| 8,797,386 | B2* | 8/2014 | Chou | A61H 3/061 348/46 |
| 2011/0106429 | A1* | 5/2011 | Poppen | G01C 21/3476 701/533 |
| 2012/0016578 | A1* | 1/2012 | Coppens | G01C 21/32 701/433 |
| 2013/0169673 | A1* | 7/2013 | Garrett | G06F 17/30241 345/629 |

(Continued)

OTHER PUBLICATIONS

Koji Yatani et al.; SpaceSense: Representing Geographical Information to Visually Impaired People Using Spatial Tactile Feedback; yatani.jp; 2012; p. 1,3,4,6, Fig. 1 and Fig. 2; yatani.jp.

(Continued)

*Primary Examiner* — Yazan A Soofi
(74) *Attorney, Agent, or Firm* — Anthony V. S. England; Erik K. Johnson

(57) ABSTRACT

A method of geospatial guidance for sight impaired users includes receiving, by a computer system, a user selection of a geospatial area. The computer system further receives a user selection of a point of interest criteria. The method includes finding, by the computer system, in a database that includes geospatial points of interest, those geospatial points of interest that match the user selected criteria and that are in the user selected geospatial area. The computer system determines a reference location in the user selected geospatial area and distance and direction from each of the found points of interest to the reference location. The computer system presents sets of information, to the user, wherein each set includes a description of one of the found points of interest together with distance and direction between the reference location and the one of the found points of interest.

20 Claims, 9 Drawing Sheets

(56) References Cited

U.S. PATENT DOCUMENTS

| | | | | |
|---|---|---|---|---|
| 2015/0127256 | A1* | 5/2015 | Cioffi | A61H 3/061 701/537 |
| 2015/0153191 | A1* | 6/2015 | Ma | G01C 21/34 701/426 |
| 2015/0330787 | A1* | 11/2015 | Cioffi | G06Q 30/0261 701/537 |
| 2017/0003132 | A1* | 1/2017 | Kim | G06T 7/246 |

OTHER PUBLICATIONS

Perkins Scout Tactile Maps and Teaching Maps Skills, http://www.perkinselearning.org/scout/tactile-maps-and-teaching-maps-skills-blind-visually-impaired, Apr. 23, 2015.

Maxwell, Rebecca, "Building Better Maps for the Visually Impaired," https://www.gislounge.com/building-better-maps-visually-impaired, Feb. 12, 2015.

Maines, Sophia, "To develop maps for the blind that are created by the blind," http://www2.ljworld.com/news/2006/dec/24/develop_maps_blind_are_created_blind, Dec. 24, 2006.

Maxwell, Rebecca, "3D Maps for the Blind," https://www.gislounge.com/3d-maps-blind, Oct. 8, 2014.

Dempsey, Caitlin, "Navigation Through Sound," https://www.gislounge.com/navigation-through-sound, Aug. 8, 2009.

"Bats, Developing Spatial Understanding," http://www.cs.unc.edu/Research/assist/bats/current.shtml, Aug. 3, 2014.

Dempsey, Caitlin, "Developing Auditory Maps for the Blind," https://www.gislounge.com/developing-auditory-maps-for-the-blind, Apr. 2, 2013.

"OSM for the blind," http://wiki.openstreetmap.org/wiki/OSM_for_the_blind, May 30, 2015.

Rutkin, Aviva, "Light beacons let map app talk to blind people," www.newscientist.com/article/mg22429913.300-light-beacons-let-map-app-talk-to-blind-people.html#.VW5al0bmU-J, Oct. 15, 2014.

* cited by examiner

TECHNOLOGY FOR GIVING USERS COGNITIVE MAPPING CAPABILITY

FIELD OF THE INVENTION

The field of the present invention concerns geospatial guidance for sight impaired users.

BACKGROUND

Traditionally geospatial computing has been performed primarily on personal computers (PCs) or servers. Due to the increasing capabilities of mobile devices, however, geospatial computing in mobile devices is a fast-growing trend. The portable nature of these devices, as well as the presence of useful sensors, such as Global Navigation Satellite System (GNSS) receivers and barometric pressure sensors, make them useful for capturing and processing geospatial information in the field. In addition to the local processing of geospatial information on mobile devices, another growing trend is cloud-based geospatial computing. In this architecture, data can be collected in the field using mobile devices and then transmitted to cloud-based servers for further processing and ultimate storage. In a similar manner, geospatial information can be made available to connected mobile devices via the cloud, allowing access to vast databases of geospatial information anywhere where a wireless data connection is available.

SUMMARY

A method of geospatial guidance for sight impaired users includes receiving, by a computer system, a user selection of a geospatial area. The computer system further receives a user selection of a point of interest criteria. The method includes finding, by the computer system, in a database that includes geospatial points of interest, those geospatial points of interest that match the user selected criteria and that are in the user selected geospatial area. The computer system determines a reference location in the user selected geospatial area and distance and from each of the found points of interest to the reference location. The computer system presents sets of information to the user, wherein each set includes a description of one of the found points of interest together with distance and direction between the reference location and the one of the found points of interest.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 6:
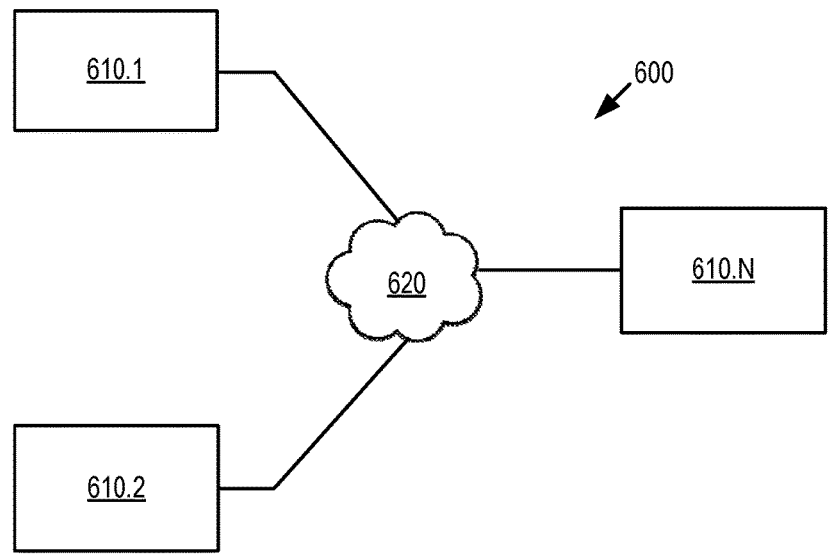
FIG. 6 illustrates a networked computer environment, according to embodiments of the present invention.

FIG. 6 illustrates an example computing environment 600, according to embodiments of the present invention. As shown, computing environment 600 includes computer systems 610.1, 610.2 through 610.N connects via network 620, which may be public or private. Systems 610.1, 610.2, etc. include modules, which may be program or hardware modules, configured to perform tasks for their own respective systems or for other systems or both.

Figure 7:
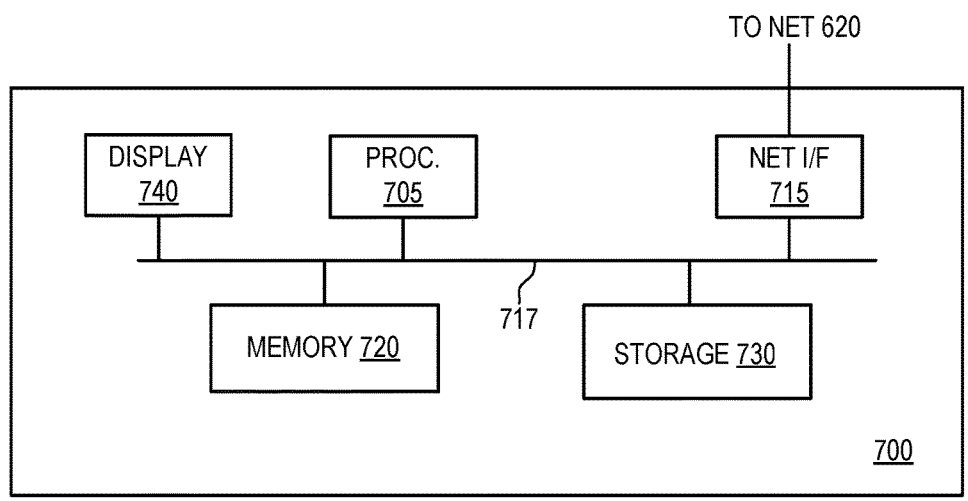
FIG. 7 is a block diagram of devices shown in FIG. 6, according to embodiments of the present invention.

FIG. 7 illustrates details of a computer system 700 suitable as computer systems 610.1, 610.2, etc. according to embodiments of the present invention, wherein system 700 includes at least one central processing unit (CPU) 705, network interface 715, interconnect (i.e., bus) 717, memory 720, storage device 730 and display 740. CPU 705 may retrieve and execute programming instructions stored in memory 720 for applications. Similarly, CPU 705 may retrieve and store application data residing in memory 720. Interconnect 717 may facilitate transmission, such as of programming instructions and application data, among CPU 705, storage 730, network interface 715, and memory 720. CPU 705 is representative of a single CPU, multiple CPUs, a single CPU having multiple processing cores, and the like. Additionally, memory 720 is representative of a random access memory, which includes data and program modules for run-time execution, according to embodiments of the present invention. It should be understood that system 700 may be implemented by other hardware and that one or more modules thereof may be firmware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

In one or more embodiments of the present invention, a computer system determines a sight impaired user's geolocation via global positioning system (GPS), determines nearby geolocations and presents them to the user in a non-visual way that, despite being non-visual, provides spatial context. (In one or more embodiments, the geolocations are presented visually.) In other embodiments of the present invention, a computer system receives a geolocation of interest to the user via input from the user, determines and presents nearby geolocations.

In one aspect, embodiments of the present invention include the computer system determining a particular, reference geolocation in a selected area as a common frame of reference for other geolocations that are points of interest (POI's) in the area. In another aspect, the computer system presents descriptions of the respective POI geolocations and distance and direction of each POI to the reference location. Further, the computer system provides an interface that allows the user to select the area of interest and define criteria for POI's, which may include the user defining specific POI's. Also, the interface allows the user to select ways for the computer system to determine the reference geolocation, which may include the user defining a specific reference geolocation, and select ways for the computer system to present distance and direction of each POI to the reference location. Through the user selections and resulting non-visual presentations of geolocation descriptions and distances and directions of the geolocations relative to a reference geolocation, the non-visual presentations and user manipulations orient a sighted impaired user in a manner such that the user can more easily comprehend locations of each point of interest relative to an overall map of the area in the mind's eye of the user.

In particular, embodiments of the present invention have the following advantageous aspects:

Insightful—Arranges POI's with a common, user-chosen frame of reference that makes it possible to see the forest (patterns) for the trees (points);

Intuitive—Makes patterns more obvious by grouping geospatially related points in a way that matches natural cognitive models of users, such as along a path, into a cone shape from the user's reference point, etc.

Efficient—Avoids inefficient wandering among POI's using sounds/echoes or a cane to navigate;

Perspective—Relates POI's to each other ("all of these are northeast," for example), versus requiring a user to remember each POI's position relative to a coordinate or addressing system;

Planning—Provides good support for planning a route among points of interest;

Effort—Does not require a user to guesstimate distance and direction to a POI;

Flexibility—Enables a user to decide criteria for grouping geospatially related points and arranges data to help a user discern paths of their own choosing, without relying on predetermined paths among points of interest;

Scalability/Flexibility—No reliance on predetermined or "hardcoded" embossing (for touch);

Scalability/Flexibility—Supports sorting at many levels of criteria—primary, secondary, tertiary, etc.;

Dexterity—No fine motor skills required;

Flexibility—Supports filtering out the "noise" (for example, only include bank machines)—or filtering it back in, on demand.

It is known to provide a screen reader software program that interfaces between the computer's operating system, its applications, and the user and that recites text displayed on a computer screen via a speech synthesizer and speaker. Alternatively, the screen reader program may interface with a braille display to present the computer screen's text on the braille display. Accordingly, data such as geolocation POI's may be presented to a sight impaired user in a tabular format via a screen reader. However, this presentation relates each POI to a geo-spatial coordinate system independently of other POI's on a map. Consequently, conventionally formatted tabular lists of POI's fail to adequately describe distributions of POI's on a map and do not tend to clearly convey geo-spatial relationships among the POI's.

In particular presentations of embodiments of the present invention, however, the computer system relates each POI to a common frame of reference in a table that provides spatial context regarding distributions of POIs on the map, i.e., in a selected area. Further, sorting functionality as described herein below can be employed to group POI's that share related geo-spatial attributes. This grouping of POI's in this way tends to reveal geolocation patterns to the unsighted user.

Figure 1:
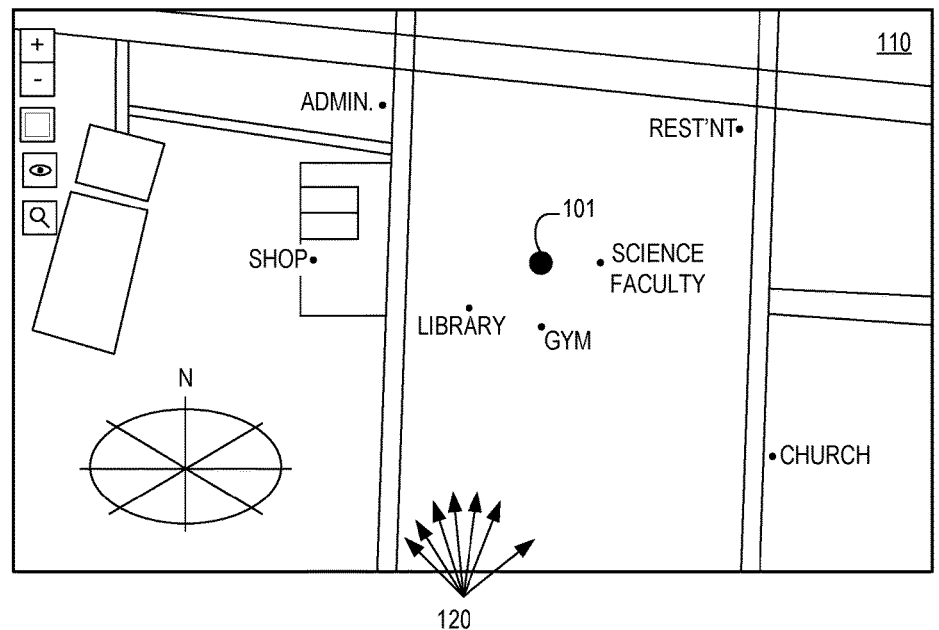
FIG. 1 shows a selected area of a map and a table that includes distance and direction of POI's relative to a calculated reference point, according to embodiments of the present invention.

Referring now to FIG. 1, a map and a table 100 that include distance 130 and direction 140 of POI's 120 relative to a calculated reference point 101 are depicted. (Note that selected areas of maps shown in Figures herein are not strictly to scale and intended to merely illustrate aspects described herein.) In the illustrated instance, direction 140 is set out both as cardinal and inter-cardinal (also known as "ordinal") direction, referred to herein for simplicity as "cardinal direction" 150 and as bearing (degrees) 160. In other instances, direction 140 may include cardinal, inter-cardinal and secondary-intercardinal directions in "cardinal direction" 150. (Cardinal directions are the four directions of north, east, south, and west, commonly denoted by their initials: N, E, S, W. Intermediate points between the four cardinal directions, northeast (NE), southeast (SE), southwest (SW), and northwest (NW), are the intercardinal directions. The intermediate directions between sets of intercardinal and cardinal directions are secondary-intercardinal directions, i.e., NNE, ENE, ESE, etc. But "cardinal direction" 150 shown in the figures herein may include intercardinal and secondary-intercardinal directions, depending on the embodiment.)

In FIG. 1, POI's 120 are presented in a spatially contextual sequence that concern calculated reference point 101. This relates to a situation where unsighted user 302 wishes to become familiar with the geography of university campus map prior to starting college that year, for example. The user selects university campus on a mapping service as an area of interest 110. On this mapping service, the faculty or students have tagged buildings and services, so that the user may dictate to the computer system that these are POI's 120. Using computational geometry, the computer system generates calculated reference point 101 that is the geometric median relative to POI's 120, i.e., a location that minimizes the sum of distances 130 from the location to POI's 120. Alternatively, the computer system generates calculated reference point 101 that is a centroid of POI's 120, i.e., a location that minimizes the sum of the squares of distances 130 from the location to the POI's 120. In a still further alternative, the computer system generates calculated reference point 101 that minimizes geometric mean, i.e., the nth root of the product of the n distances from reference point 101 to POI's 120. In a still further alternative, the computer system generates calculated reference point 101 that minimizes the arithmetic-geometric mean of distances 130 from reference point 101 to POI's 120. It should be appreciated that for all these ways of determining a reference point 101, distances 130 from reference point 101 to POI's 120 are minimized according to a minimizing criteria. A developer may predetermine which one of these minimizing criteria for the computer system to use in determining reference point 101. Alternatively, the developer may provide that the user may specify on a case-by-case basis which minimizing criteria the user wants the computer system to use.

The computer system then determines distances 130, cardinal, inter-cardinal and secondary-inter-cardinal directions 150, and bearings 160 from reference point 101 to POI's 120. The computer system may then present POI's 120 together with their distances 130 and directions 140 to the user audibly or in a braille display in a sequence, which may be a listing (e.g., table 100). With table 100 presented in this format, unsighted user 302 can develop a spatial awareness for POI's, in this case allowing the 'mind's eye' to see the relative position of buildings and services on a University Campus.

From the foregoing it should be appreciated that FIG. 1 illustrates a map of POI's 120 and reference point 101 and table 100 of POI's 120 that show distance 130 and direction 140 from a calculated reference location to each POI, where the reference location in this illustrated instance has been determined by the computer system to minimize the sum of distances 130. With table 100 presented audibly in this format, unsighted user 302 can develop a spatial awareness for the geolocations of POI's 120, in this case allowing the 'mind's eye' to see how the locations of buildings and services in a university campus relate to one another.

Figure 2:
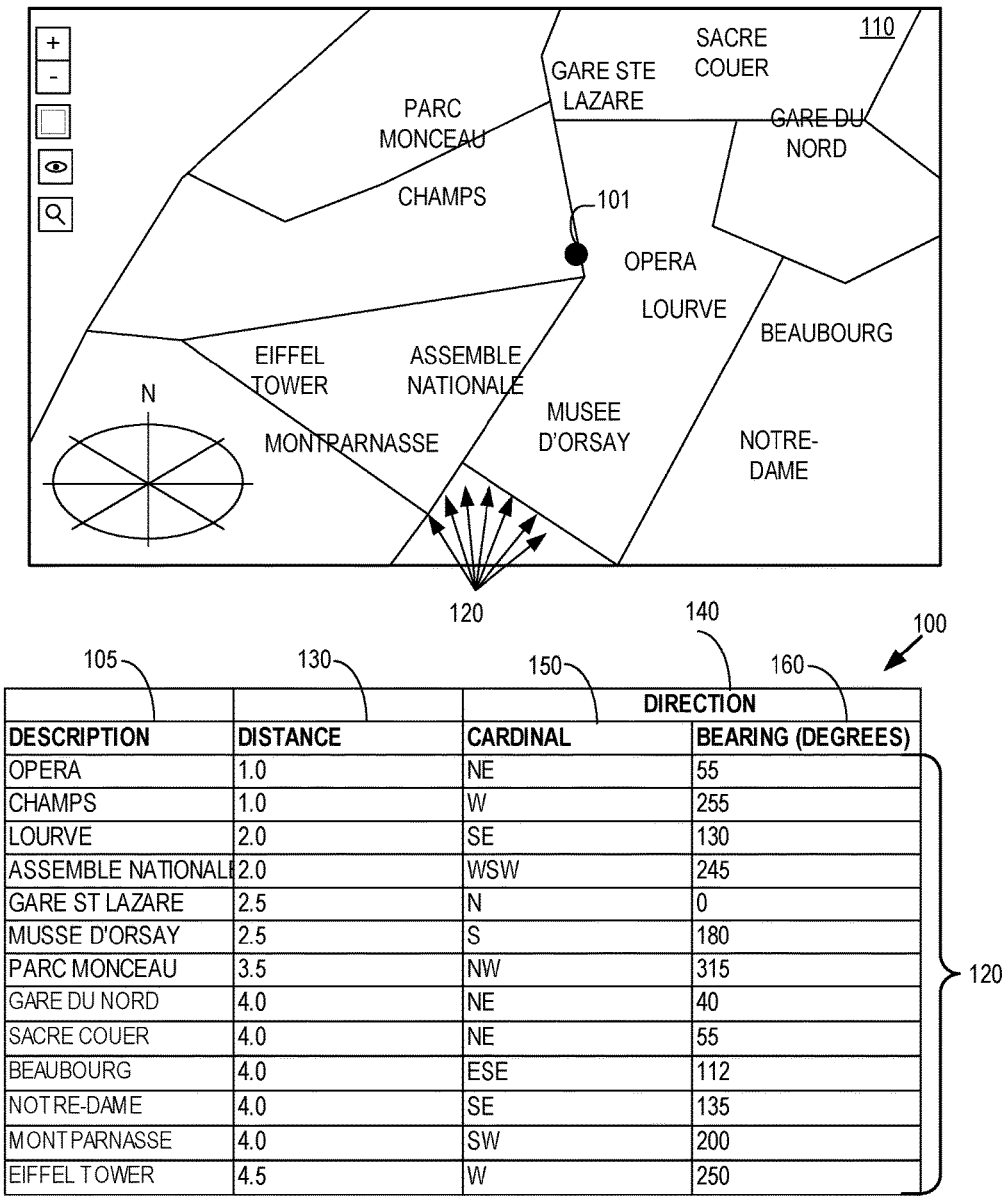
FIG. 2 shows a selected area of a map and a table that includes directions and distances from a predetermined reference point to POI's, according to embodiments of the present invention.

FIG. 2 illustrates a selected area 110 of a map and a table of POI's 120 that includes directions and distances from a predetermined reference point to the POI's 120, according to embodiments of the present invention. POI's 120 are presented in a spatially contextual sequence, e.g., in a sequence of rows for a table, where the rows are fixed in a tangible media (braille display) or spoken audibly (voice synthesizer), that concern a predetermined reference point 101 selected by a user. (A refreshable braille display is an electro-mechanical device having a flat surface and a matrix of variable objects thereon that present patterns of raised dots to generate braille characters. These dots may be produced by round-tipped pins, where the device varies a pin by selectively raising it to produce a dot that can be can be physically felt by a user's fingers. The device lowers the pin to produce absence of a dot. Computer users who are sight impaired can use a braille display to read text output from a computer.)

An embodiment such as illustrated in FIG. 2 may relate to a situation where unsighted user 302 plans to stay at a hotel in Paris, for example, and wishes to understand the locations of tourist attractions there relative to the hotel where the user plans to stay. The user selects the city of Paris on a mapping service as an area of interest 110, which the user may do by dictating "Select Paris as area of interest 110" to the computer system, for example. On this mapping service, the general public has tagged POI's 120 for tourists, so that the user may dictate to the computer system that these are POI's 120 of interest. The user selects the planned hotel as the predetermined reference point 101, which the user may do by dictating the name and address of the hotel to the computer system as the reference location 101, for example, so that the computer system can look up the coordinates of the hotel using the mapping service. (Alternatively, if the user was already at the hotel, the user could dictate "Use current location as reference location" to the computer system, since the computer system is typically carried by the user and the computer system includes a GPS for determining position of the computer system.) The computer system then determines distances 130 and direction 140 from reference point 101 to POI's 120. The computer system may then present POI's 120, their distances 130 and directions 140 to the user audibly or in a braille display in a sequence, which may be a listing (e.g., table 100).

FIG. 2 illustrates a map of POI's 120 and reference point 101 and table 100 of POI's 120 that shows distance 130 and direction 140 from the predetermined reference location 101 selected by the user, i.e., the user's hotel, to each POI 120, i.e., tourism POI's. With table 100 presented audibly in this format, unsighted user 302 can develop a spatial awareness for the geolocations of POI's 120, in this case allowing the 'mind's eye' to see how the locations of tourism POI's relate to one another and, most especially, to the user's hotel.

Figure 3:
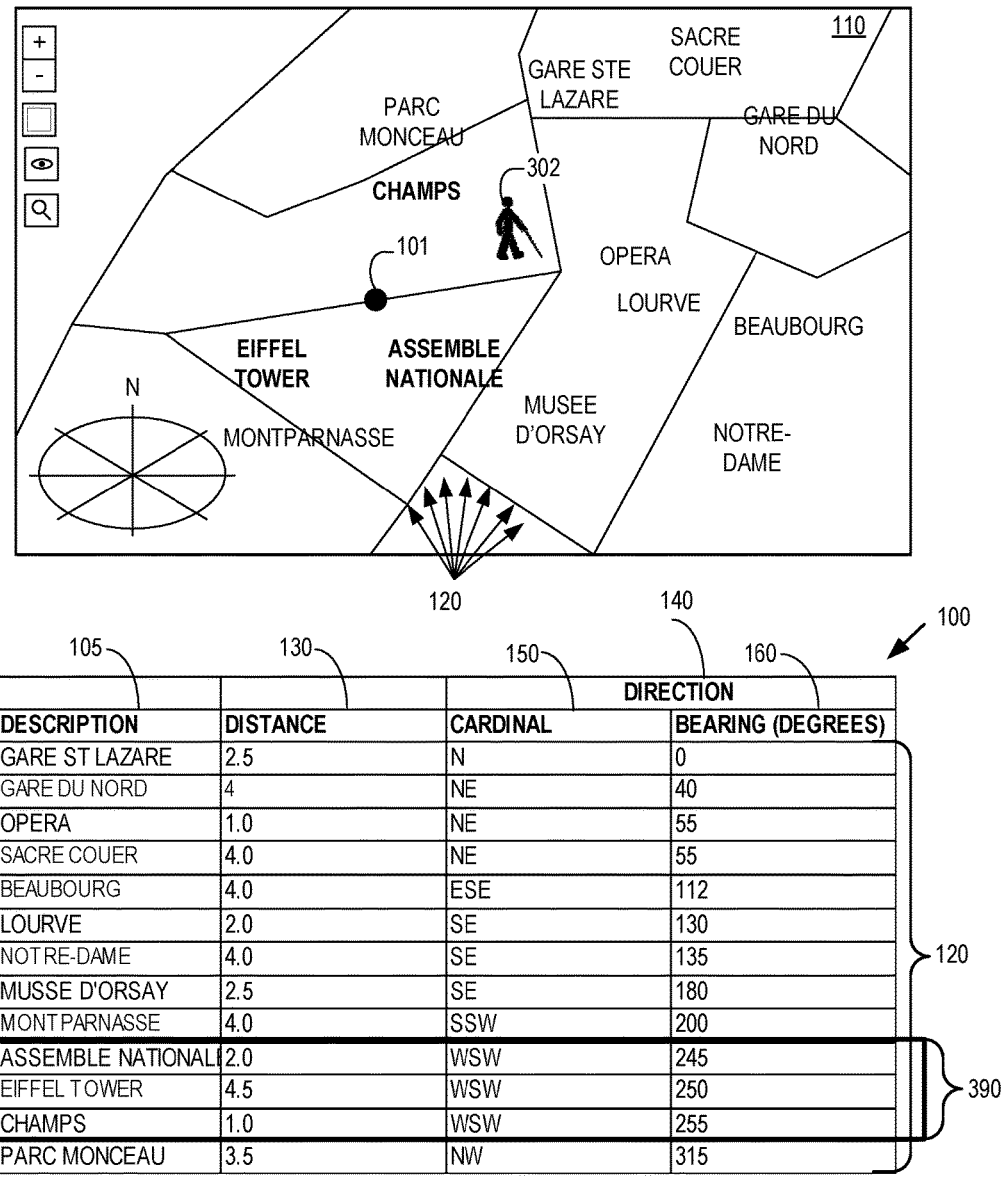
FIG. 3 shows a selected area of a map and a table that includes directions and distances from a predetermined reference point with directional sort, according to embodiments of the present invention.

FIG. 3, illustrates a selected area 110 of a map and a table 100 that includes directions 140 and distances 130 from a predetermined reference point 110 with directional sort. POI's 120 are presented in a spatially contextual sequence that concern possible directions a user 302 may travel, for example. This relates to a situation where unsighted user 302 plans to visit the Eiffel Tower, for example, and wishes to understand if there are any tourist attractions on route. User 302 selects an area between user 302 current location and the Eiffel Tower as an area of interest 110, such as by dictating "Selected area 110 is between current location and Eiffel Tower" to the computer system. In response, the computer system looks up the coordinates of user 302 current location and that of the Eiffel Tower using the mapping service and determines an appropriate area of coverage there between. The appropriate area of coverage may be predetermined by the developer and may be dependent on a mode by which user 302 will travel there between. For example, in one or more embodiments, user 302 may dictate "Select an area between current location and Eiffel Tower for walking mode." Or, as other examples, user 302 may dictate that the mode is public transportation or driving. A developer may have predetermined that for walking mode, the selected area 110 is half as wide as the distance between the current location and the reference location, for example. The developer may have predetermined that for driving mode, the selected area 110 is twice as wide as the distance between the current location and the reference location, for example.

On a mapping service, the general public has tagged POI's 120 for tourists, so that user 302 may dictate to the computer system that tourist POI's 120 in the selected area 110 area of interest. Since user 302 will be traveling to the Eiffel Tower, user 302 selects the Eiffel Tower as the predetermined reference point 101, which user 302 may do by dictating "Eiffel Tower is reference point" to the computer system, for example, so that the computer system can look up the coordinates of the Eiffel Tower using the mapping service if it has not already done so. The computer system then determines distances 130 and directions 140 from Eiffel Tower reference point 101 to POI's 120. The computer system may then present POI's 120, their distances 130 and directions 140 to user 302 audibly or in a braille display in a sequence, which may be a listing (e.g., table 100), where POI's 120 are sorted by the respective directions 140, i.e., either bearings 160 or cardinal directions 150, from reference point 101 to POI's 120.

FIG. 3 illustrates a map of POI's 120 and reference point 101 together with table 100 that shows distance 130 and direction 140 from the predetermined reference location selected by user 302, i.e., the Eiffel Tower, to each POI, i.e., tourism POI's. With table 100 presented audibly in this format, where POI's 120 are presented in order of increasing bearing 160 (or, alternatively, in order of decreasing bearing 160), this reveals line of sight relations to unsighted user 302 for POI's 120 that are generally on route to the Eiffel Tower. Three tourist POI's are highlighted as a group 390 in table 100, in the illustrated instance, since they share a secondary-intercardinal direction 150 from the hotel to the Eiffel Tower, i.e. West-South-West.

In an embodiment in which table 100 of FIG. 3 is presented on a braille display, the user may physically detect (by feeling the "cardinal" direction column 150) a pattern of felt dots (representing "WSW") that are the same for all three POI's 120 in group 390 and can thereby apprehend their physical arrangement and relationship in the real world. That is, for a braille display that presents an entire table 100 (or at least the cardinal direction 150 column and the description 105 column, or some other indicia of POI identity), the physical proximity of POI 120 grouping 390 set out in a braille display table 100 (in a way that can be tangibly felt) correspond to physical proximity of those POI's 120 in the real world. (Likewise, for a visual computer system display that presents a table 100 of at least direction and identity, the physical proximity of POI 120 grouping 390 set out in table 100 (in a way that can be visually seen) correspond to physical proximity of those POI's 120 in the real world.) For a braille display that presents a row of POI's at a time, the sequential proximity of the group 390 of POI's 120 set out one row after another in order of "cardinal" direction 150 corresponds to physical proximity of the corresponding POI's in the real world. Likewise, the sequential proximity of POI's set out in a table spoken row by row by computer system voice synthesis in order of "cardinal" direction 150 also correspond to physical proximity of the corresponding POI's in the real world.

Figure 4A:
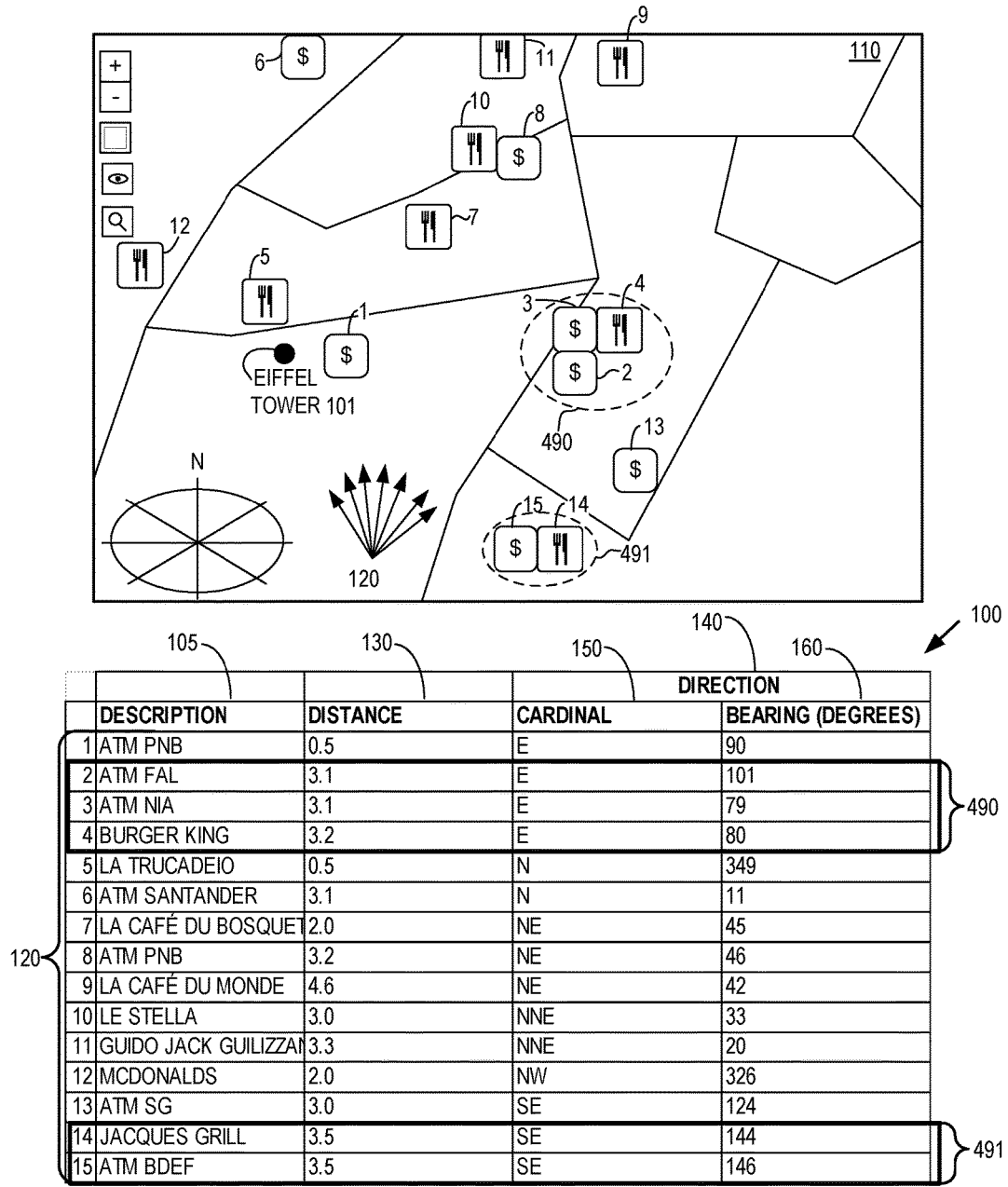
FIG. 4A shows a selected area of a map and a table that includes cardinal, inter-cardinal, and secondary inter-cardinal directions and distances from a predetermined reference point to POI's with directional and distance sort, which illustrates clustered POI's, according to embodiments of the present invention.

FIG. 4A illustrates a selected area 110 of a map and a table 100 that include cardinal, inter-cardinal, and secondary inter-cardinal directions 150 and distances 130 from a predetermined reference point 110 to POI's 120, where the particular way the POI's 120 are presented in this embodiment reveals clusters 490 and 491 of POI's 120, according to embodiments of the present invention. If unsighted user 302 is at the Eiffel Tower one morning on a day trip, for example, user 302 may then wish to locate a restaurant for lunch that is in an area near the Eiffel Tower and also locate an ATM within close proximity of the restaurant. User 302 selects an area around the Eiffel Tower on a mapping service as an area of interest 110, which user 302 may do by dictating "Select area surrounding Eiffel Tower as area of interest 110 for walking" to the computer system, for example. In response, the computer system looks up the coordinates of the Eiffel Tower using a mapping service and determines an appropriate area of coverage surrounding the Eiffel Tower. The appropriate area of coverage may be predetermined by the developer and may be dependent on the mode by which user 302 will travel there between. For example, the predetermined area for walking may be an area with a one-mile radius around the Eiffel Tower. Alternatively, user 302 may select the area around the Eiffel Tower by dictating "Select circle with a one-mile radius surrounding Eiffel Tower as area of interest 110" to the computer system, for example. On a mapping service, the general public has tagged restaurants and banking services. Accordingly, user 302 may dictate to the computer system that POI's 120 in the selected area of interest 110 are restaurants and ATM machines.

Since user 302 will be traveling from the Eiffel Tower, user 302 selects the Eiffel Tower as the predetermined reference point 101, which user 302 may do by dictating "Eiffel Tower is reference point" or "current location is reference point" to the computer system, for example, so that the computer system can look up the coordinates of the Eiffel Tower using the mapping service if it has not already done so, or else can use coordinates of user 302 current location as determined by a GPS of the computer system. The computer system then determines distances 130 and directions 140 from the Eiffel Tower/current location reference point 101 to POI's 120. The computer system may then present POI's 120, their distances 130 and directions to user 302 audibly or on a braille display in a sequence, which may be a listing (e.g., table 100), where POI's 120 are sorted by the "cardinal" direction 150 from reference point 101 to POI's 120. User 302 may then, after sorting by direction 150, also sort by distance 130 to reveal clusters 490 and 491 of POI's 120. With table 100 presented audibly or on a braille display in this format, where POI's 120 are presented in order of cardinal, intercardinal and secondary-intercardinal direction 150 AND secondarily in order of distance 130, this reveals clusters 490 and 491 of POI's 120 to unsighted user 302. These POI's 120 in group 490 and 491 are revealed to be clusters because not only are their directions 150 the same ("E" for group 490 and "SE" for group 491), but the distances 130 of the POI's 120 in group 490 are close together. That is, for group 490, two of the POI's 120 are 3.1 miles East of the reference point 101 and one is 3.2 miles East, whereas another POI 120, i.e., row 1 of table 100, is revealed to NOT be in a cluster with the group 490, even though it is East of the reference point, since it is 0.5 miles from the reference point, quite a distance away from the other POI's that are East of the reference point 101. Likewise, for group 491 the two POI's 120 are both 3.5 miles Southeast of the reference point 101. In table 100, the POI 120 in the row immediately above the two in group 491 is NOT nearby them, i.e., not in a cluster with them, even though it is Southeast of the reference point 101, since it is 3.0 miles from the reference point 101.

It is generally up to the user to decide how close is close enough to consider POI's as a cluster when they are in the same direction from a reference point. The user may decide to ignore the least significant digit of the distance, for example, in which case the user may deem to include the POI 120 in the row immediately above the two in group 491. Or the user may decide based on an absolute distance cutoff, such as 0.4 miles, when walking for example, in which case the user will not include the POI 120 in the row immediately above the two in group 491. One rule that may be applied for how close POI's must be to be deemed a cluster is that POI's in the same direction from a reference point must be within 10% of the same distance away from the reference point.

Figure 8:
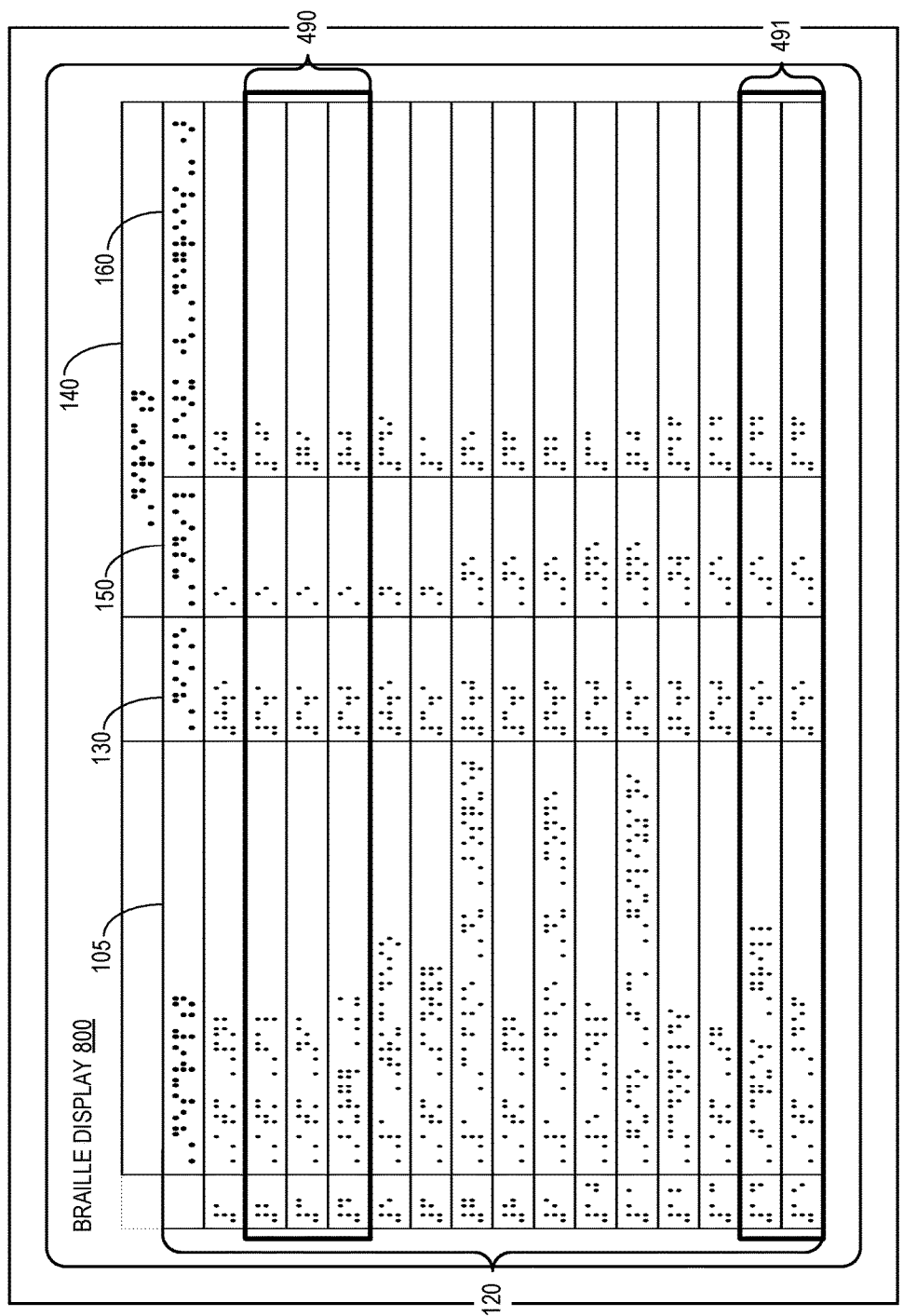
FIG. 8 shows a braille display, according to embodiment of the present invention.

FIG. 8 shows the table of FIG. 4A as presented on a braille display 800, according to embodiment of the present invention. This serves to further illustrate that in an embodiment in which table 100 of FIG. 4A is presented on a braille display, the user may physically detect (by feeling the "cardinal" direction column 150) a pattern of felt dots (representing "E") that are the same for all three POI's 120 in group 490 and can then physically detect (by feeling the distance column 130) a pattern of felt dots (representing "3.1" and "3.2") that are nearly the same for all three POI's 120 in group 490. In this manner, the user may apprehend the physical arrangement and relationship of proximity in the real world of this group 490 of POI's 120. Likewise, for group 491 regarding dots for "SE" (direction 150) and for "3.5" (distance 130). That is, for a braille display that presents an entire table 100 (or at least the cardinal direction 150 column, distance column 130 and the description 105 column, or some other indicia of POI identity), the physical proximity of POI 120 groupings 490 and 491 set out in a braille display table 100 (in a way that can be tangibly felt) correspond to physical proximity of those POI's 120 in the real world. (Likewise, for a visual computer system display that presents a table 100 of at least direction and identity, the physical proximity of POI 120 groupings 490 and 491 set out in table 100 (in a way that can be visually seen) correspond to physical proximity of those POI's 120 in the real world.) For a braille display that presents a row of POI's at a time, the sequential proximity of the groups 490 and 491 of POI's 120 set out one row after another in order of "cardinal" direction 150 and distance 130 corresponds to physical proximity of the corresponding POI's in the real world. Likewise, the sequential proximity of POI's set out in a table spoken row by row by computer system voice synthesis in order of "cardinal" direction 150 and distance 130 also correspond to physical proximity of the corresponding POI's in the real world.

Figure 4B:
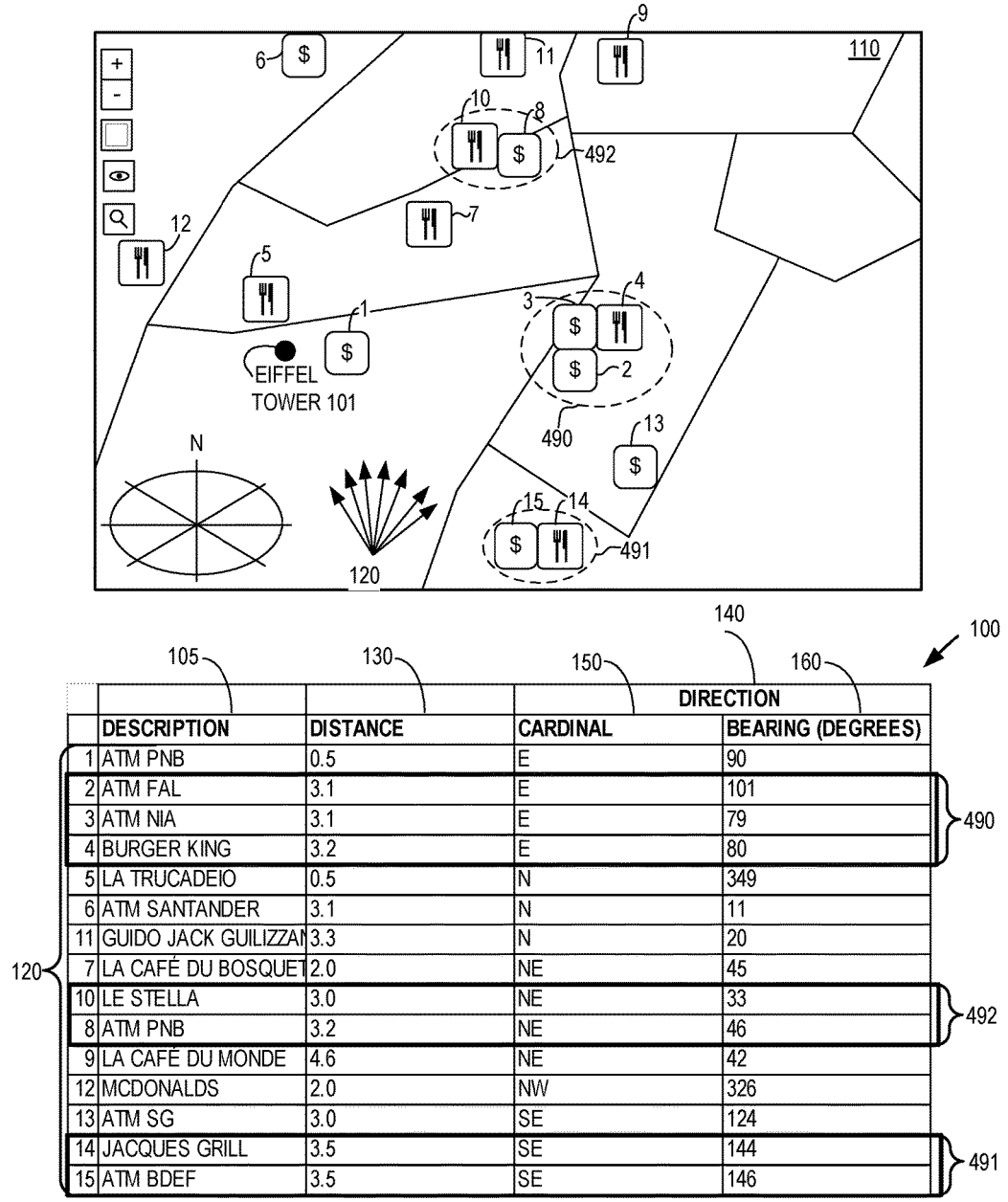
FIG. 4B shows a selected area of a map and a table that includes distances and directions, but excludes secondary-inter-cardinal directions, from a predetermined reference point to POI's with directional and distance sort, which illustrates clustered POI's, according to embodiments of the present invention.

Referring now to FIG. 4B, a selected area 110 of a map and a table 100 are shown that are generally like that of FIG. 4A, according to embodiments of the present invention, except that for FIG. 4B, the user directs the computer system to limit the direction 150 column of table 100 to only include cardinal and inter-cardinal direction categories (i.e., no secondary inter-cardinal directions). When the computer system presents to user 302 the POI's 120 together with their distances 130 and directions 150 from reference point 101 sorted, as in FIG. 4A, first by direction 150 and then by distance 130. By increasing the size of the direction categories to 45 degrees, as compared to 22.5 degrees when secondary inter-cardinal directions were included, a new cluster 492 is revealed, wherein two POI's are Northeast of the reference point 101 and within 0.2 miles of one another, i.e., one is 3.0 miles from the reference point and the other is 3.0 miles from the reference point. Thus, by increasing the range of degrees in the distance categories, three clusters 490, 491, and 492 of restaurants and ATMs are revealed and highlighted in table 100 in the illustrated instance, instead of two clusters 490 and 491 in FIG. 4A.

Figure 9:
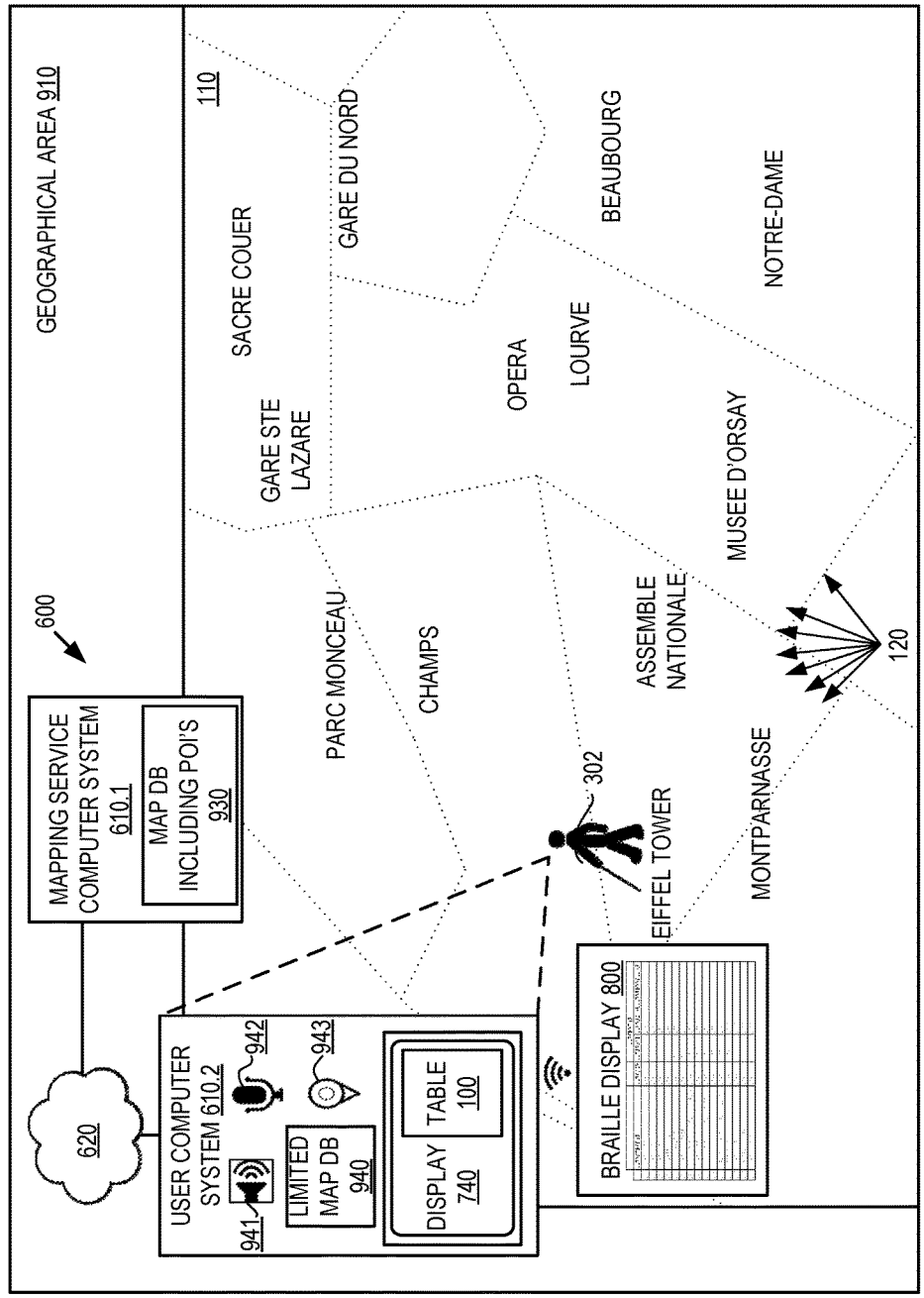
FIG. 9 illustrates additional aspects of computing environment 600 in connection with geospatial guidance for sight impaired users, according to embodiments of the present invention.

Referring now to FIG. 9, additional aspects of computing environment 600 are illustrated, according to embodiments of the present invention. As shown, computing environment 600 includes mapping computer system 610.1 and user computer system 610.2 connected via network 620, which may be public or private. Mapping computer system 610.1 includes global map database 930 with POI's. User computer system 610.2 may include a more limited map database 940, which may be subset of global map database 930. User computer system 610.2 may be a handheld computer device, such as a smartphone, for use by sight impaired user 302. User computer system 610.2 includes display 740 from which user 302 may access table 100. User computer system 610.2 further includes GPS 943 and speaker 941 and microphone 942, which interface with a voice recognition program and voice synthesis program in system 610.2. The voice recognition program and voice synthesis program may be supplemented programs in a remote computer system or may reside there instead of in system 610.2. Braille display 800 may be provided as a wireless or wired accessory to user computer system 610.2 for use by sight impaired user 302.20

Figure 5:
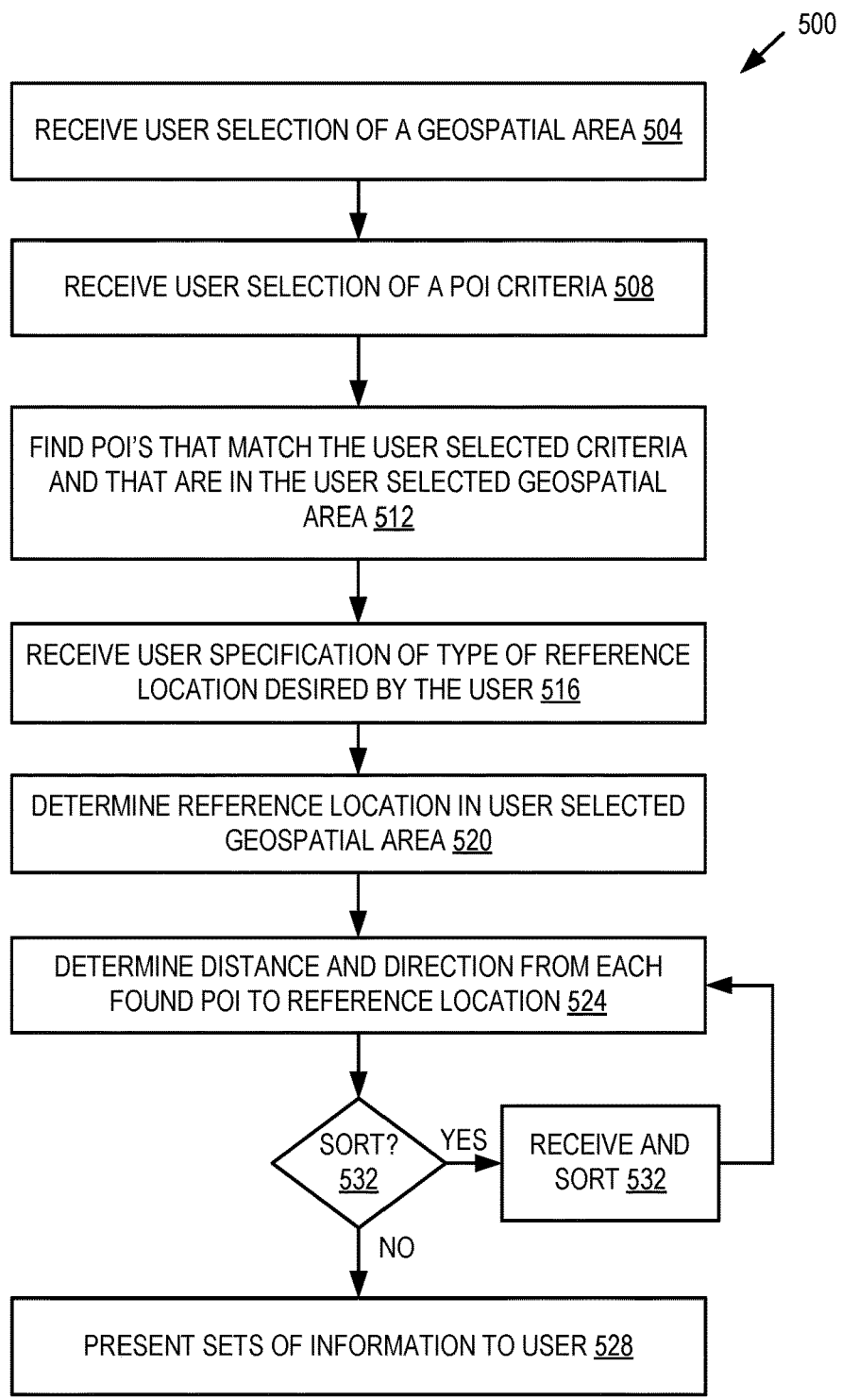
FIG. 5 is a flow chart showing actions by a computer system, according to one or more embodiments of the present invention.

FIG. 5 is a flow chart 500 illustrating actions by a computer system according to one or more embodiments of the present invention. Referring now to FIG. 5, a computer system receives 504 user selection of a geospatial area (a selected area, such as area 110 in the other Figures). The user may select a geospatial area in the following ways, for example. The computer system determines the user's current location via GPS responsive to the user indicating that the geospatial area relates to the user's current location. (Alternatively, the computer system determines the user's current location via GPS independently of whether the selected geospatial area relates to the user's current location, since the user's current location will likely be used, regardless of the user's selection.) The user may communicate with the computer system via voice recognition. That is, for example, the computer system receives a spoken command from the user, via a microphone and voice recognition module of the computer system, indicating a selection that relates to the user's current location, such as "Select a rectangular area from where I am now to 2000 yards East of me and 1000 yards North and 1000 yards South of me." Or the user may say, for example, "Select a circular area, where I am now in the center and the radius is 700 yards." Or the user may say, for example, "Select a circular area, where I am now on the circle and the diameter is 1 mile long with a 90 degree bearing 160." Or the user may say, for example, "Select a circular area, where I am now on the circle and the diameter extends from me to the Eiffel Tower." Or the user may say, for example, "Select the University of Michigan, Ann Arbor campus, as an area of interest 110."

Also, the computer system receives 508 user selection of a POI criteria. Regarding the University of Michigan, Ann Arbor campus, for example, the user may dictate to the computer system, "Select buildings and services on the campus as points of interest."

Responsive to the received user specification of the geospatial area and the POI criteria, the computer system finds 512, in a database of geospatial POI's, those POI's that match the user selected criteria and that are in the user selected geospatial area.

The computer system receives 516 user specification of a type of reference location desired by the user. According to various embodiments of the present invention, the user may specify the user's current location as the reference location, in which case the computer system may responsively determine the user's current location, if it has not already done so. The user may alternatively specify some other specific location as the reference location, such as a destination of the user, for example. In another alternative, the user may specify that the computer system shall determine a reference location based on POI's found by the computer system.

Responsive to receiving the type of reference location that the user wants, the computer system determines 520 a reference location in the user selected geospatial area. This may include merely designating the user's current location in the first alternative described above or designating the user specified location (e.g., user destination) in the second alternative. In the third alternative, i.e., responsive to receiving a user command indicating that the user wants the computer system to determine a reference location based on the found POI's, the computer system determines a particular geolocation that minimizes distances of the found POI's to the particular geolocation according to a predetermined minimization criteria and designates this particular geolocation as the reference location.

In another action, 524, the computer system determines distance, bearing and direction from each of the found POI's to the reference location. Then, the computer system presents 528 to the user sets of information, where each set includes a description of one of the found POI's together with distance, direction and bearing between the reference location and the one of the found POI's. In one aspect, the presenting of the sets of information to the user for the found POI's may include announcing for each set, by an audio speaker of the computer system, a description of a POI and the distance, direction and bearing between the reference location and the POI. In an alternative aspect, the presenting of each set of information for the found POI's may be on a braille display and may include, for each set, presenting a POI description and the distance, direction and bearing between the reference location and the POI.

In one aspect, the user may specify 532 for the computer system to sort the sets into a sequence according to their respective bearings, i.e., according to the direction from each POI to the reference location, which may be expressed as degrees, with North being zero degrees, for example. (Alternatively, the computer system may present the sets sorted by bearing as an initial default.) In this manner, the sets are presented in a sequence of increasing or decreasing bearing, with POI's having the same or similar bearings presented together in the sequence, which tends to reveal to sight impaired user line of sight relations among the points of interest.

Alternatively, the user may specify 532 for the computer system to sort the sets into a sequence according to one or more of their cardinal, intercardinal and secondary-intercardinal directions, i.e., according to the direction from each POI to the reference location. (Alternatively, the computer system may present the sets sorted by cardinal, intercardinal and secondary-intercardinal directions as an initial default, or by cardinal and intercardinal directions as an initial default.) In this manner, the sets are presented in a sequence where POI's are grouped according to their direction relative to a reference point.

In another aspect, the user may specify for the computer system to next sort 536 the sets by distance, after the sets are sorted by direction. In this manner, the sets are not only presented with POI's of same direction from a reference point presented near one another in the sequence, but POI's of same direction are further presented in subsequences according to their distances from the reference point, so that the presented sets tend to reveal clusters of POI's to sight impaired user, where points of interest that are physically more near to one another are presented more near to one another in a subsequence.

While this specification contains many specifics, these should not be construed as limitations on the scope of the invention or of what can be claimed, but rather as descriptions of features specific to particular implementations of the invention. Certain features described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of geospatial guidance for sight impaired users comprising:
   receiving, by a computer system, a user selection of a geospatial area;
   receiving, by the computer system, a user selection of a point of interest criteria;
   finding, by the computer system, in a database that includes geospatial points of interest, those geospatial points of interest that match the user selected criteria and that are in the user selected geospatial area;
   determining, by the computer system, a reference location in the user selected geospatial area;
   determining, by the computer system, distance and direction from each of the found points of interest to the reference location; and
   presenting, to the user by the computer system, sets of information, wherein each set includes a description of one of the found points of interest together with distance and direction between the reference location and the one of the found points of interest, and where presenting the sets of information comprises:
      presenting the sets of information sorted in a sequence by both the distances and the directions, where the sorting by directions includes sorting by bearings and where the sorting by distances is after the sorting by directions, so that the sequence in which the sets are presented tends to reveal to a user line of sight relations among the points of interest.

2. The method of claim 1, wherein presenting the direction for each set includes presenting a cardinal and ordinal direction.

3. The method of claim 1, wherein presenting the direction for each set includes presenting a bearing.

4. The method of claim 1, wherein determining the reference location in the user selected geospatial area comprises:
   determining, as the reference location in the user selected geospatial area, a reference location that minimizes distances from the reference location to the found points of interest according to a minimizing criteria.

5. The method of claim 1, wherein determining the reference location in the user selected geospatial area comprises:
   determining, by a global positioning system of the computer system, a current location of the user; and
   designating the current location of the user to be the reference location in the user selected geospatial area.

6. The method of claim 1, comprising:
   receiving, by the computer system from the user, a destination of the user, and wherein determining the reference location in the user selected geospatial area comprises:
   designating the destination location of the user to be the reference location in the user selected geospatial area.

7. The method of claim 4, wherein the minimizing criteria includes a geometric mean criteria.

8. A system of geospatial guidance for sight impaired users comprising:
   a processor; and
   a computer readable storage medium connected to the processor, wherein the computer readable storage medium has stored thereon a program for controlling the processor, and wherein the processor is operative with the program to execute the program for:
      receiving, by a computer system, a user selection of a geospatial area;
      receiving, by the computer system, a user selection of a point of interest criteria;
      finding, by the computer system, in a database that includes geospatial points of interest, those geospatial points of interest that match the user selected criteria and that are in the user selected geospatial area;
      determining, by the computer system, a reference location in the user selected geospatial area;
      determining, by the computer system, distance and direction from each of the found points of interest to the reference location; and
      presenting, to the user by the computer system, sets of information, wherein each set includes a description of one of the found points of interest together with distance and direction between the reference location and the one of the found points of interest, and where presenting the sets of information comprises:
presenting the sets of information sorted in a sequence by both the distances and the directions, where the sorting by directions includes sorting by bearings and where the sorting by distances is after the sorting by directions, so that the sequence in which the sets are presented tends to reveal to a user line of sight relations among the points of interest.

9. The system of claim 8, wherein presenting the direction for each set includes presenting a cardinal and ordinal direction.

10. The system of claim 8, wherein presenting the direction for each set includes presenting a bearing.

11. The system of claim 8, wherein determining the reference location in the user selected geospatial area comprises:
determining, as the reference location in the user selected geospatial area, a reference location that minimizes distances from the reference location to the found points of interest according to a minimizing criteria.

12. The system of claim 8, wherein determining the reference location in the user selected geospatial area comprises:
determining, by a global positioning system of the computer system, a current location of the user; and
designating the current location of the user to be the reference location in the user selected geospatial area.

13. The system of claim 8, comprising:
receiving, by the computer system from the user, a destination of the user, and wherein determining the reference location in the user selected geospatial area comprises:
designating the destination location of the user to be the reference location in the user selected geospatial area.

14. The system of claim 11, wherein the minimizing criteria includes a geometric mean criteria.

15. A computer program product of geospatial guidance for sight impaired users, including a computer readable storage medium having instructions stored thereon for execution by a computer system, wherein the instructions, when executed by the computer system, cause the computer system to implement a method comprising:
receiving, by a computer system, a user selection of a geospatial area;
receiving, by the computer system, a user selection of a point of interest criteria;
finding, by the computer system, in a database that includes geospatial points of interest, those geospatial points of interest that match the user selected criteria and that are in the user selected geospatial area;
determining, by the computer system, a reference location in the user selected geospatial area;
determining, by the computer system, distance and direction from each of the found points of interest to the reference location; and
presenting, to the user by the computer system, sets of information, wherein each set includes a description of one of the found points of interest together with distance and direction between the reference location and the one of the found points of interest, and where presenting the sets of information comprises:
presenting the sets of information sorted in a sequence by both the distances and the directions, where the sorting by directions includes sorting by bearings and where the sorting by distances is after the sorting by directions, so that the sequence in which the sets are presented tends to reveal to a user line of sight relations among the points of interest.

16. The computer program product of claim 15, wherein presenting the direction for each set includes presenting a cardinal and ordinal direction.

17. The computer program product of claim 15, wherein presenting the direction for each set includes presenting a bearing.

18. The computer program product of claim 15, wherein determining the reference location in the user selected geospatial area comprises:
determining, as the reference location in the user selected geospatial area, a reference location that minimizes distances from the reference location to the found points of interest according to a minimizing criteria.

19. The computer program product of claim 15, wherein determining the reference location in the user selected geospatial area comprises:
determining, by a global positioning system of the computer system, a current location of the user; and
designating the current location of the user to be the reference location in the user selected geospatial area.

20. The computer program product of claim 15, comprising:
receiving, by the computer system from the user, a destination of the user, and wherein determining the reference location in the user selected geospatial area comprises:
designating the destination location of the user to be the reference location in the user selected geospatial area.

* * * * *